(12) United States Patent
Ho et al.

(10) Patent No.: US 8,472,145 B2
(45) Date of Patent: Jun. 25, 2013

(54) ARM COIL ASSEMBLY, ARM FLEXIBLE CABLE ASSEMBLY AND DISK DRIVE UNIT WITH THE SAME

(75) Inventors: Yiusing Ho, HongKong (CN); Canhua Chen, DongGuan (CN); Guohong Lu, DongGuan (CN)

(73) Assignee: SAE Magnetics (H.K.) Ltd, Hong Kong (CN)

( * ) Notice: Subject to any disclaimer, the term of this patent is extended or adjusted under 35 U.S.C. 154(b) by 252 days.

(21) Appl. No.: 12/929,029

(22) Filed: Dec. 22, 2010

(65) Prior Publication Data
US 2012/0075741 A1 Mar. 29, 2012

(30) Foreign Application Priority Data
Sep. 26, 2010 (CN) .......................... 2010 1 0512489

(51) Int. Cl.
*G11B 21/08* (2006.01)
(52) U.S. Cl.
USPC ..................................................... 360/264.2
(58) Field of Classification Search
USPC ............. 360/264.2, 294.4, 254.1, 245.9, 266, 360/245.8, 244.1, 265.7, 265.1, 264.8, 245, 360/264.4
See application file for complete search history.

(56) References Cited

U.S. PATENT DOCUMENTS

| | | | | |
|---|---|---|---|---|
| 5,644,452 A | * | 7/1997 | Cox et al. | 360/264.2 |
| 6,992,864 B2 | * | 1/2006 | Kaneko et al. | 360/264.2 |
| 7,355,818 B2 | * | 4/2008 | McReynolds et al. | 360/264.2 |
| 2006/0146510 A1 | * | 7/2006 | Seol et al. | 361/807 |
| 2009/0046391 A1 | * | 2/2009 | Wu et al. | 360/264.2 |

* cited by examiner

*Primary Examiner* — Allen T Cao
(74) *Attorney, Agent, or Firm* — Nixon & Vanderhye PC

(57) ABSTRACT

An arm coil assembly includes a drive arm having at least two grounding pins formed on a mounting region thereof and a voice coil fixed on the tailing end of the drive arm for controlling the drive arm. The grounding pins are provided for electrically connecting with a flexible printed cable assembly by extending through at least two mounting holes formed on the flexible printed cable assembly. Each grounding pin has a slot formed thereon to clamp the flexible printed cable assembly. The arm coil assembly of the present invention having grounding pins with slot structure to clamp the flexible printed cable assembly which is mounted on the drive arm to form an arm flexible cable assembly, thus, the flexible printed cable assembly can be pre-mounted onto the arm coil assembly without using any additional fixtures or tools, therefore simplifying the mounting process and reducing the manufacturing cost thereof. The invention also discloses an arm flexible cable assembly and a disk drive unit including the same.

15 Claims, 11 Drawing Sheets

ARM COIL ASSEMBLY, ARM FLEXIBLE CABLE ASSEMBLY AND DISK DRIVE UNIT WITH THE SAME

This application claims the benefit of Chinese Patent Application No. 201010512489.2, filed Sep. 26, 2010, the entire contents of which is hereby incorporated by reference in this application.

FIELD OF THE INVENTION

The present invention relates to information recording disk drive devices and, more particularly, to an arm coil assembly having grounding pins with slot structure, arm flexible cable assembly and disk drive unit with the same.

BACKGROUND OF THE INVENTION

One known type of information storage device is a disk drive device that uses magnetic media to store data and a movable read/write head that is positioned over the magnetic media to selectively read from or write to the magnetic media.

FIG. 1 provides an illustration of a typical disk drive unit 1000. The typical disk drive unit 1000 include a magnetic hard disk 101, a spindle motor 102 for rotating the disk 101 at a high speed, a head stacking assembly (HSA) 100 configured to read data from and write data to a magnetic hard disk 101, a spindling voice-coil motor (VCM) 103 provided for controlling the motion of the head stacking assembly (HSA) 100, all of which are mounted into a housing 104.

FIG. 2a shows a typical HSA 100, and FIG. 2b is an exploded view of the HSA 100. Referring to FIG. 2a and FIG. 2b, HAS 100 includes an arm coil assembly (ACA) 110, a jut 120, at least one head gimbal assembly (HGA) 130 and a bearing body 140, all of which are assembled together. Concretely, the flexible printed cable assembly (FPCA) 120 is mounted onto one side of the arm coil assembly (ACA) 110, the bearing body 140 is mounted into a through hole of the ACA 110, and the head gimbal assembly (HGA) 130 with a suspension 131 is mounted onto the top portion 111 of the ACA 110 and electrically connect with the FPCA 120. The suspension 131 supports a slider 132 with a read/write transducer (not show). When the disk drive unit 1000 is on, the spindle motor 102 will rotate the disk 101 at a high speed, and the slider 132 will fly above the disk 101 due to the air pressure drawn by the rotated disk 101. The slider 132 moves across the surface of the disk 101 in the radius direction under the control of the VCM 103. With a different track, the slider 132 can read data from or write data to the disk 101.

FIG. 3a shows a typical arm flexible cable assembly (AFA) 105 and FIG. 3b is an exploded view of the AFA 105. As shown in FIG. 3a and FIG. 3b, the AFA 105 is mainly composed of the ACA 110 and FPCA 120. The ACA 110 has two grounding pins 112 and 113 disposed on one side thereof. Accordingly, the FPCA 120 has two holes 122 and 123 formed therein. The FPCA 120 is mounted onto the ACA 110 by aligning two holes 122 and 123 with two grounding pins 112 and 113, respectively and then they are soldered to be electrical connected and fixed together.

However, for the above traditional AFA 105, when installing the FPCA 120 onto the ACA 110 to form the AFA 105, it needs to use fixtures or tools to keep the FPCA 120 being positioned onto the ACA 110 before soldering, otherwise FPCA 120 will escape away freely from ACA 110 due to spring force caused in a dynamical region 124 of the FPCA 120. This design is complex for AFA assembly process and the AFA 105 even will be damaged due to the use of the fixtures or tools. In result, the manufacturing cost of the AFA 105 will increase.

Accordingly, it is desired to provide an improved arm coil assembly (ACA) to overcome the above-mentioned drawbacks.

SUMMARY OF THE INVENTION

One objective of the present invention is to provide an improved arm coil assembly for simplifying the AFA assembly process, thereby reducing the manufacturing cost thereof.

Another objective of the present invention is to provide an arm flexible cable assembly having an improved arm coil assembly for simplifying assembly process, thereby reducing the manufacturing cost thereof.

Still another objective of the present invention is to provide a disk drive unit having an improved arm coil assembly for simplifying assembly process, thereby reducing the manufacturing cost thereof.

To achieve above objectives, the present invention provides an arm coil assembly including a drive arm having at least two grounding pins formed on a mounting region thereof and a voice coil fixed on the tailing end of the drive arm for controlling the drive arm. The grounding pins are provided for electrically connecting with a flexible printed cable assembly by extending through at least two mounting holes formed on the flexible printed cable assembly. Each grounding pin has a slot formed thereon to clamp the flexible printed cable assembly.

As an embodiment of the present invention, the slot has a symmetric structure with an axis of the grounding pin as symmetric axis. Preferably, the slot is ring shaped.

As another embodiment of the present invention, the surface of the grounding pin is covered by coating matter.

As still another embodiment of the present invention, the grounding pins are installed into the mounting region of the drive arm along a diagonal thereof by press-fit.

The present invention further provides an arm flexible cable assembly including a flexible printed cable assembly which includes a controlling circuit board and a flexible printed cable with at least two mounting holes formed in a connecting region thereof, and an arm coil assembly which includes a drive arm having at least two grounding pins formed on a mounting region thereof and a voice coil fixed on the tailing end of the drive arm for controlling the drive arm. The grounding pins are provided for electrically connecting with a flexible printed cable assembly by extending through at least two mounting holes formed on the flexible printed cable assembly. Each grounding pin has a slot formed thereon to clamp the flexible printed cable assembly.

As an embodiment of the present invention, the mounting hole is composed of a first through hole formed in the connecting region of the flexible printed cable and a second through hole formed in a stiffener which is mounted on the connecting region. Preferably, the first through hole is smaller than the second through hole. Preferably, a grounding pad whose thickness is smaller than the width of the slot is formed around the first through hole. The grounding pad is made of copper material and coating material.

As an embodiment of the present invention, the slot has a symmetric structure with an axis of the grounding pin as symmetric axis. Preferably, the slot is ring shaped.

As another embodiment of the present invention, the surface of the grounding pin is covered by coating matter.

As still another embodiment of the present invention, the grounding pins are installed into the mounting region of the drive arm along a diagonal thereof by press-fit.

The present invention further provides a disk drive unit including a head gimbal assembly which includes a slider and a suspension with a suspension tongue that supports the slider, an arm flexible cable assembly connected to the head gimbal assembly, a disk and a spindle motor operable to spin the disk. The arm flexible cable assembly includes a flexible printed cable assembly including a controlling circuit board and a flexible printed cable with at least two mounting holes formed in a connecting region thereof and an arm coil assembly including a drive arm having at least two grounding pins formed on a mounting region thereof and a voice coil fixed on the tailing end of the drive arm for controlling the drive arm. The grounding pins are provided for electrically connecting with a flexible printed cable assembly by extending through at least two mounting holes formed on the flexible printed cable assembly. Each grounding pin has a slot formed thereon to clamp the flexible printed cable assembly.

In comparison with the prior art, the arm coil assembly (ACA) includes a drive arm with grounding pins, each of which has a slot structure formed thereon for clamping the flexible printed cable assembly (FPCA) which is mounted on the drive arm, therefore the flexible printed cable assembly will not escape away freely from the grounding pins. Thus, the FPCA can be pre-mounted onto the ACA without using any additional fixture or tools, it is benefit for AFA loading and unloading for next soldering process, especially for auto soldering process, for example, laser soldering, so as to achieves the purpose that simplifying the mounting process to reduce the manufacturing cost.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 2b is an exploded perspective view of the HGA shown in FIG. 2a;

FIG. 3b is an exploded perspective view of the AFA shown in FIG. 3a;

FIG. 8b is another perspective view of the FPCA shown in FIG. 8a;

FIG. 9a shows a connecting region of the FPCA shown in FIG. 8a;

FIG. 9b shows a stiffener of the FPCA shown in FIG. 8a;

FIG. 11b shows a soldering connection of the AFA shown in FIG. 11a,

DETAILED DESCRIPTION OF ILLUSTRATED EMBODIMENTS

Figure 1:
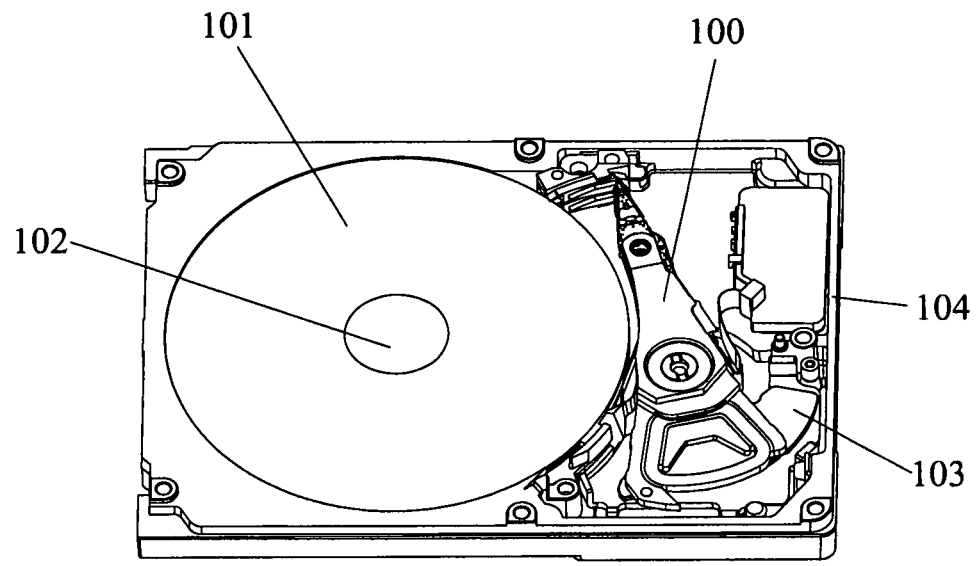
FIG. 1 is a perspective view of a conventional disk drive unit.
Figure 2A:
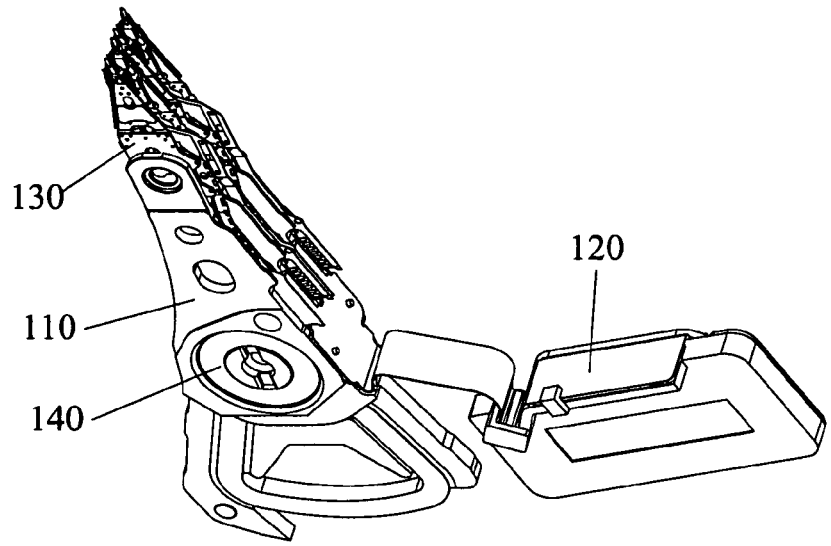
FIG. 2a is a perspective view of a conventional HGA.
Figure 2B:
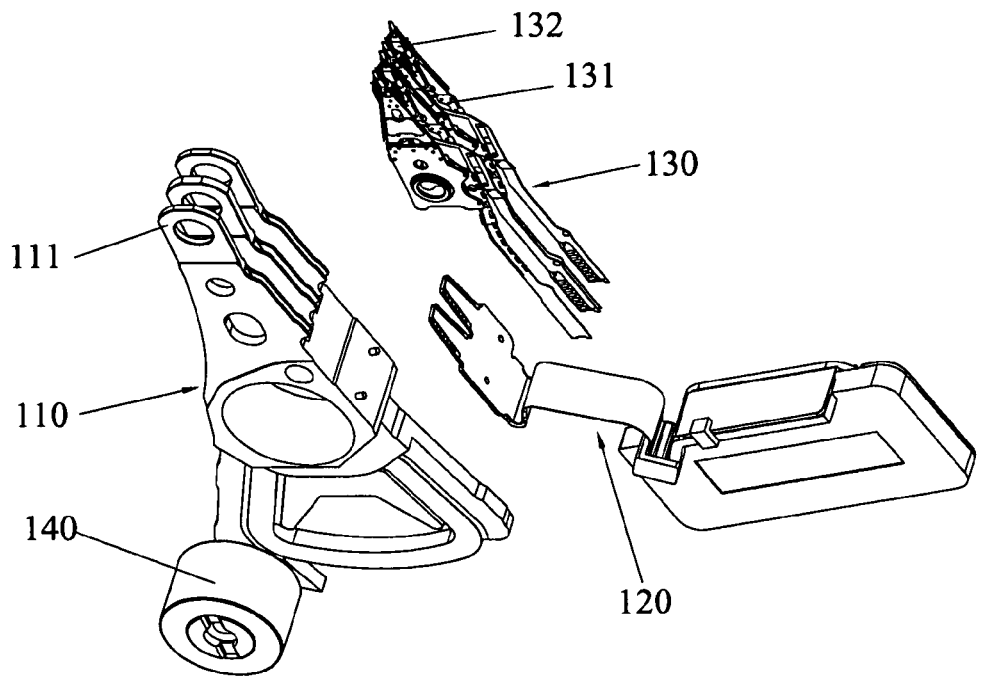
Figure 3A:
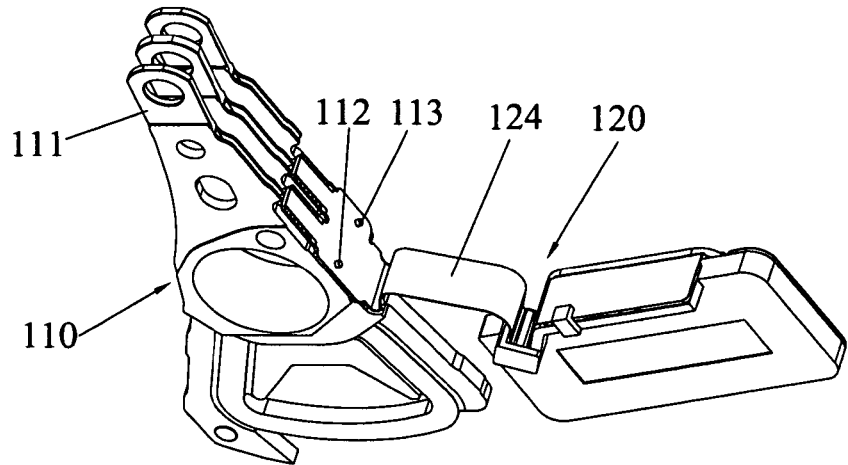
FIG. 3a is a perspective view of a conventional AFA.
Figure 3B:
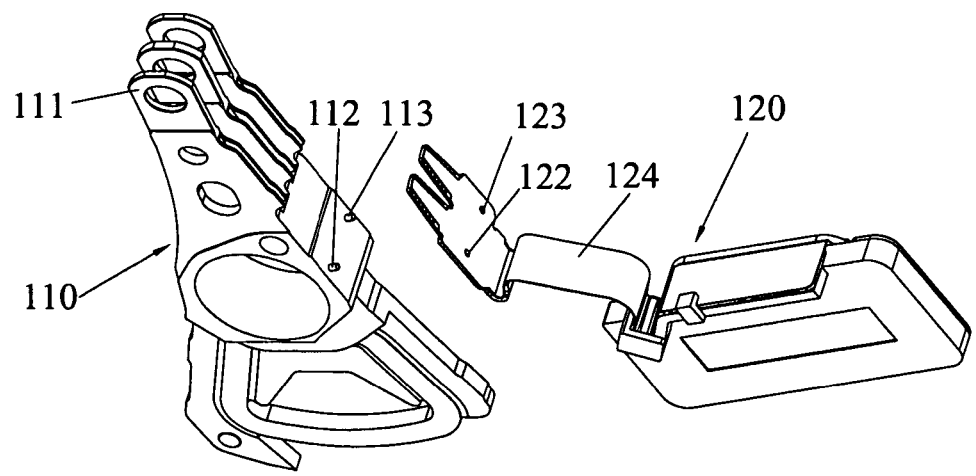

Various preferred embodiments of the invention will now be described with reference to the figures, wherein like reference numerals designate similar parts throughout the various views. As indicated above, the invention is directed to an arm coil assembly including a drive arm having at least two grounding pins formed on a mounting region thereof and a voice coil fixed on the tailing end of the drive arm for controlling the drive arm. The grounding pins are provided for electrically connecting with a flexible printed cable assembly by extending through at least two mounting holes formed on the flexible printed cable assembly. Each grounding pin has a slot formed thereon to clamp the flexible printed cable assembly. Because the grounding pin has a slot structure to clamp the flexible printed cable assembly, the flexible printed cable assembly can be avoided to escape away freely from the grounding pins. Thus, the FPCA can be pre-mounted onto the ACA without using any additional fixtures or tools, therefore simplifying the mounting process and reducing the manufacturing cost thereof.

Figure 4:
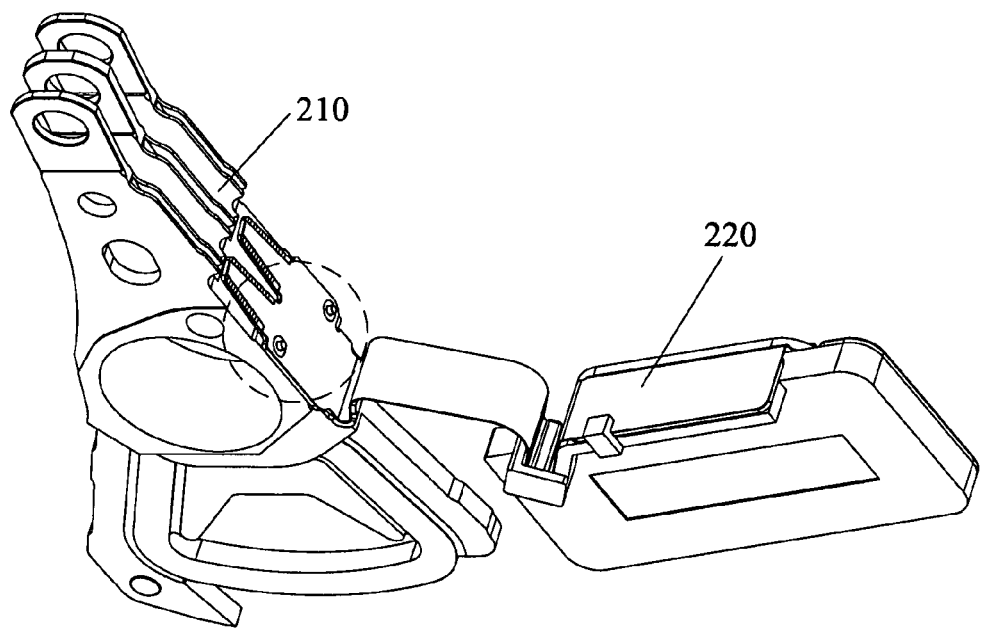
FIG. 4 is a perspective view of an AFA according to an embodiment of the present invention.

FIG. 4 shows an embodiment of an arm flexible cable assembly of the present invention. Referring to FIG. 4, the arm flexible cable assembly (AFA) 205 includes an arm coil assembly (ACA) 210 and a flexible printed cable assembly (FPCA) 220 which connected with the arm coil assembly 210.

Figure 5:
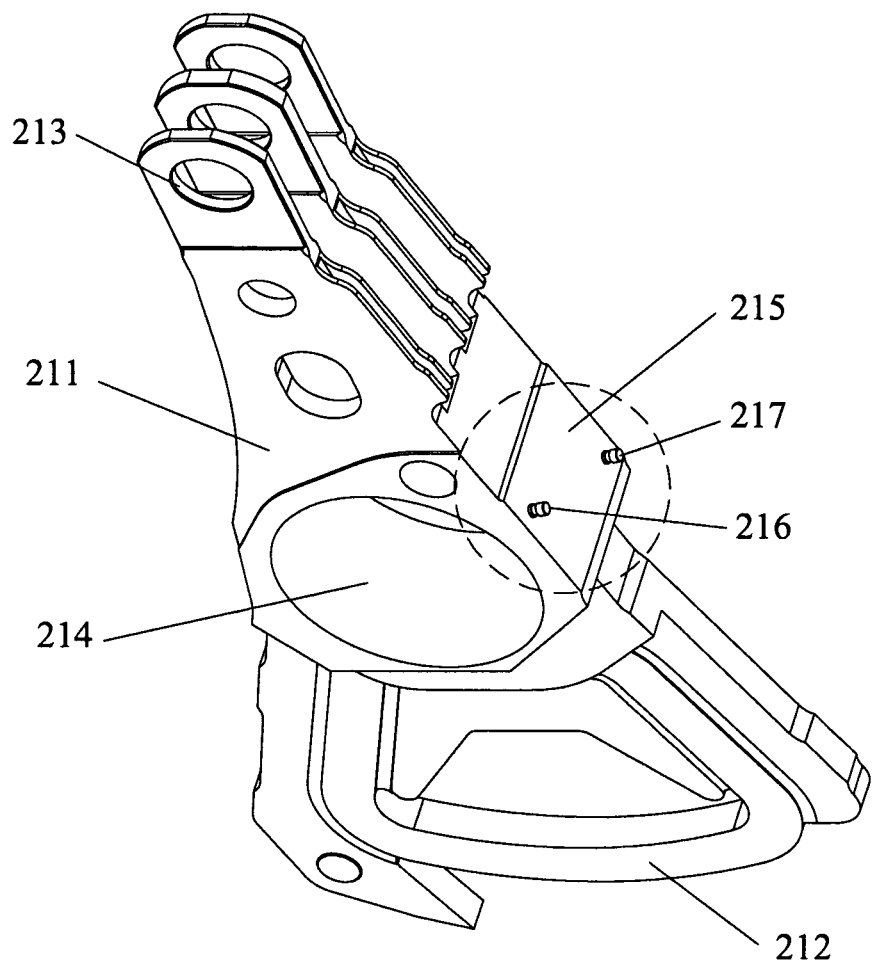
FIG. 5 is a perspective view of an ACA according to an embodiment of the present invention.

FIG. 5 is a perspective view of the ACA 210. As illustrated in FIG. 5, the arm coil assembly (ACA) 210 includes a drive arm 211 and a voice coil 212 fixed on the tailing end of the drive arm 211 for controlling the drive arm 211. Several locating holes 213 are formed in the top portion of the drive arm 211 for mounting at least one head gimbal assembly and a mounting hole 214 formed in the bottom portion of the drive arm 211 is provided for mounting a bearing body (not shown). One side of the bottom portion of the drive arm 211 is a rectangular mounting region 215 which has a flat surface. On this flat surface of the mounting region 215, two grounding pins 216 and 217 are provided to connect with the flexible printed cable assembly 220.

Figure 6:
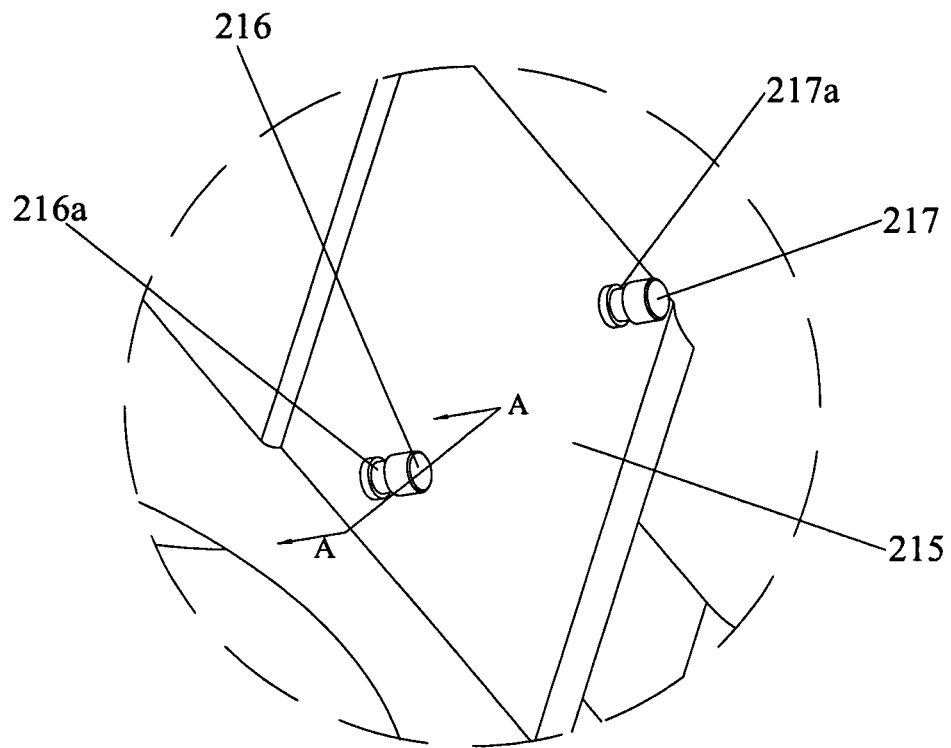
FIG. 6 is a partial enlarged view of the ACA shown in FIG. 5.
Figure 7:
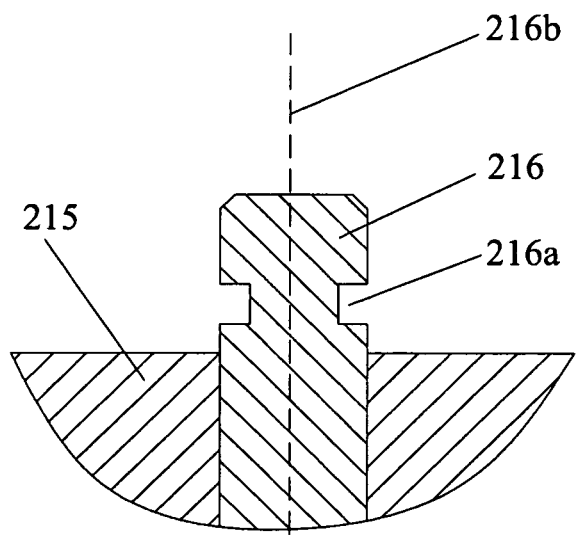
FIG. 7 is a cross-sectional side view of the ACA shown in FIG. 6 taken along the line A-A thereof.

FIG. 6 is a partial enlarged view of the ACA 210 and FIG. 7 is a partial cross-sectional side view of the ACA 210. As shown in FIG. 6, the grounding pins 216 and 217 are installed into the mounting region 215 along a diagonal thereof by press-fit. The drive arm 211 and the grounding pins 216, 217 are made of metal material which are good for electrical grounding. Preferably, the grounding pins 216, 217 further has coating matter covering the surface thereof to be benefit for good soldering.

Now, referring to FIG. 6 and FIG. 7, the grounding pins 216 and 217 has the same structure. The grounding pin 216 is a cylinder with a curving side on which a slot 216a is formed. The slot 216a has a symmetric structure with an axis 216b of the grounding pin 216 as symmetric axis. Similarly, the grounding pin 217 is a cylinder with a curving surface and a slot 217a is formed on the curving surface. The slot 217a has a symmetric structure with an axis of the grounding pin 217 as symmetric axis. In this embodiment, both of the slots 216a and 217a are ring shaped.

Figure 8A:
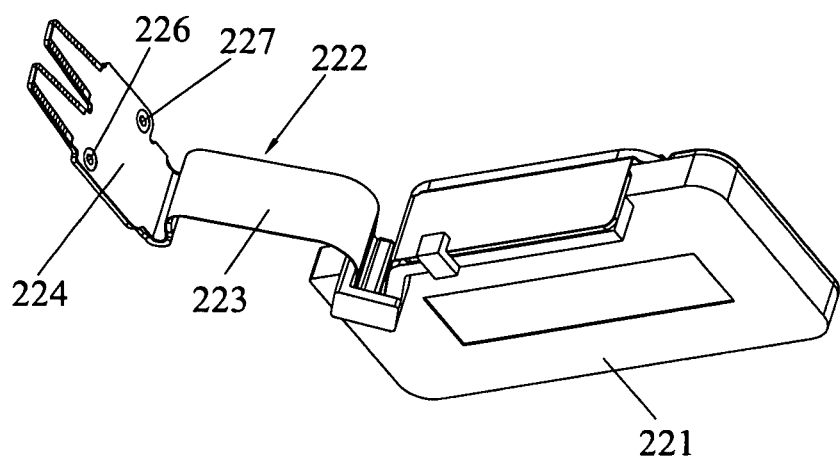
FIG. 8a is a perspective view of an FPCA included in the AFA shown in FIG. 4.
Figure 8B:
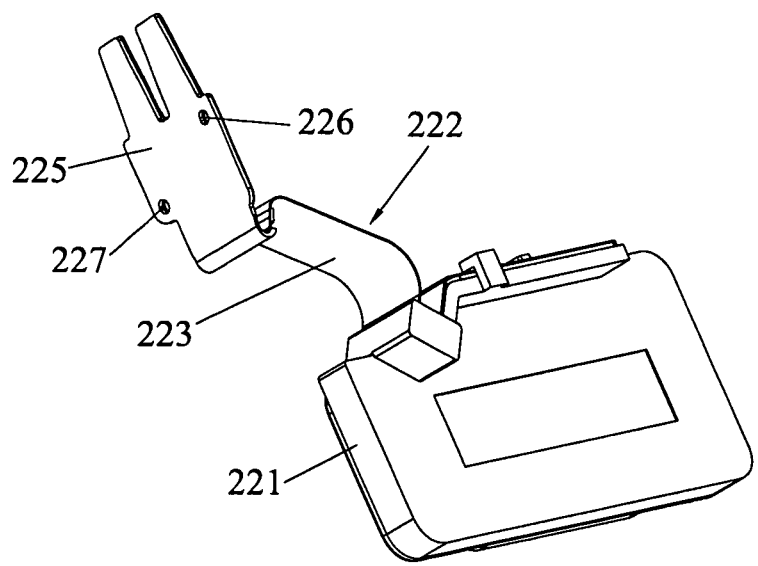
Figure 9A:
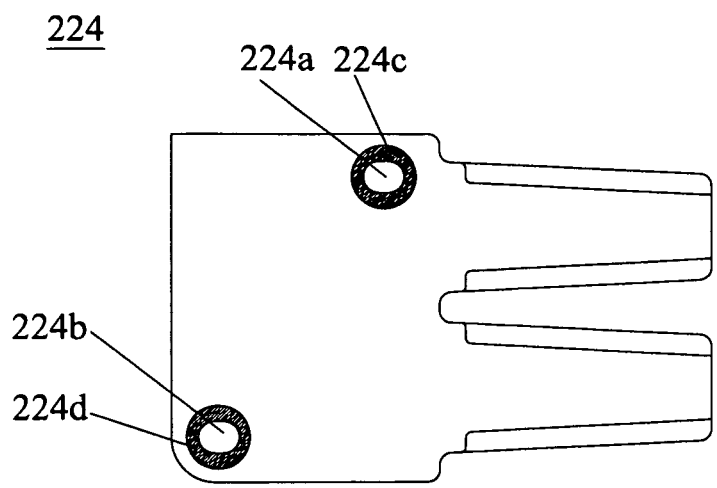
Figure 9B:
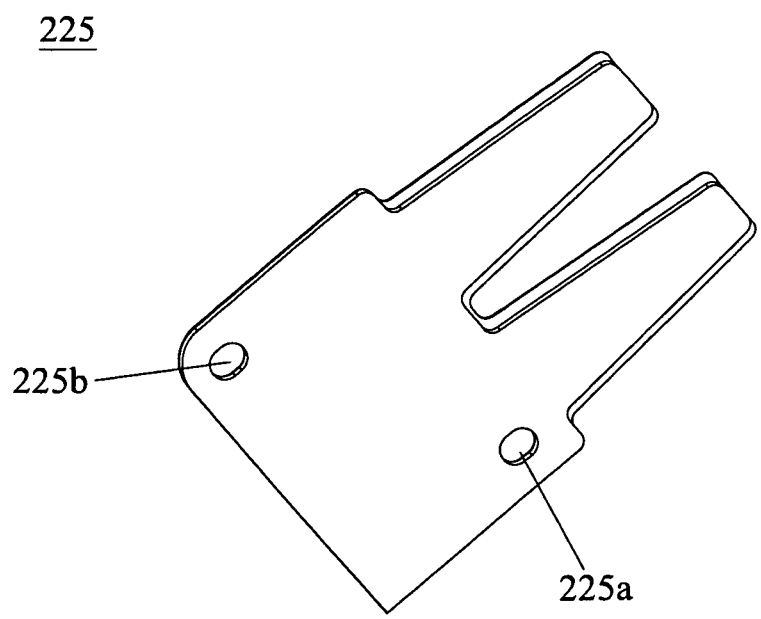

Referring to FIG. 8a and FIG. 8b, the flexible printed cable assembly (FPCA) 220 includes a controlling circuit board 221 and a flexible printed cable 222 electrically connecting with the controlling circuit board 221. The flexible printed cable 222 has a dynamical region 223 and a connecting region 224 with a stiffener 225 mounted thereon for keeping the shape of the connecting region 224, thereby the connecting region 224 can be mounted to the ACA 210 more easily. FIG. 9a shows the connecting region 224 of the FPCA 220 and FIG. 9b shows the stiffener 225. Referring to FIG. 9a, the connecting region 224 has two first through holes 224a and 224b formed therein. Preferably, there are two grounding pads 224c and 224d formed on the top surface of the connecting region 224 and the grounding pads 224c and 224d are disposed around the first through holes coating material, respectively. Concretely, the grounding pads 224c, 224d are made of copper material and coating material for good soldering, and the thickness of the grounding pads 224c, 224d are smaller than the width of the slots 216a, 217a. As illustrated in FIG. 9b, the stiffener 225 has two second through holes 225a and 225b formed therein. The first through holes 224a, 224b are smaller than the second through holes 225a, 225b and the section area of the grounding pins 216,217. In this embodiment, all of the through holes (including the first through holes 224a, 224b and the second through holes 225a and 225b) are round in shape.

Referring to FIG. 8a to FIG. 9b, the stiffener 225 is bonded to the back surface of the connecting region 224 by adhesive, for example epoxy. When bonding, the first through holes 224a, 224b are aligned with the second through holes 225a, 225b, respectively, that is the first through holes 224a and the second through hole 225a are coaxial while the first through holes 224b and the second through hole 225b are coaxial. After bonding, the first through hole 224a and the second through hole 225a composes a mounting hole 226, similarly, the first through hole 224b and the second through hole 225b composes a mounting hole 227, as shown in FIG. 8a and FIG. 8b.

Figure 10:
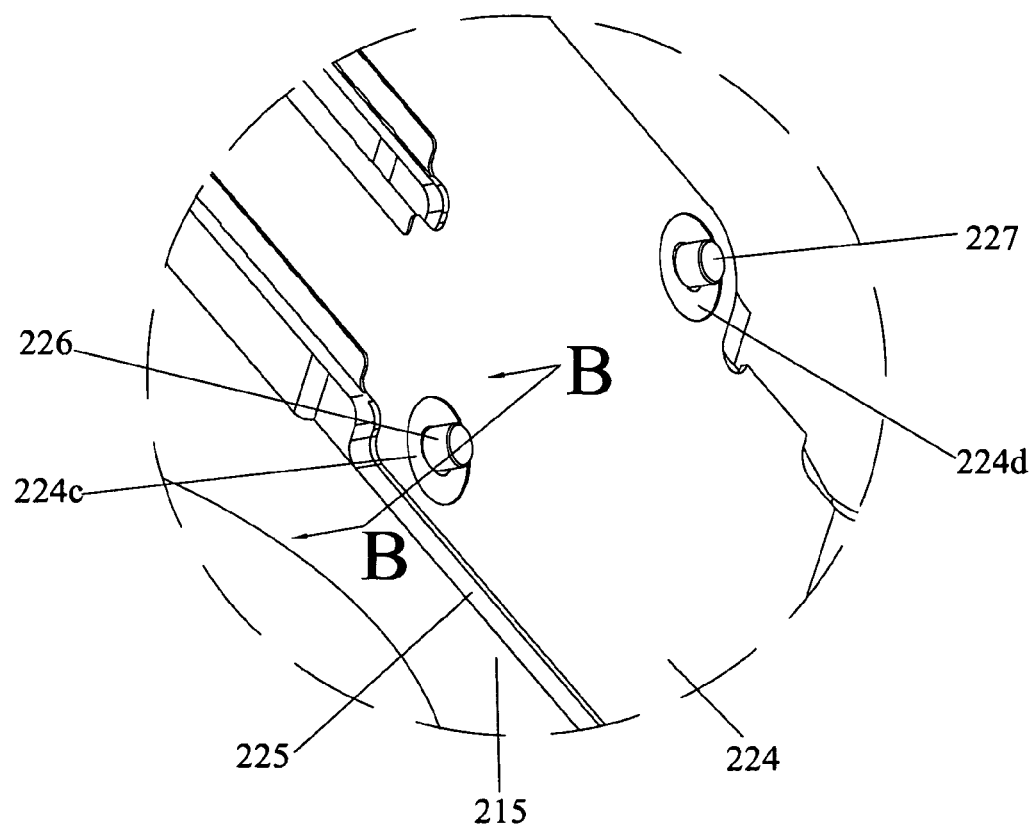
FIG. 10 is a partial enlarged view of the AFA shown in FIG. 4.
Figure 11A:
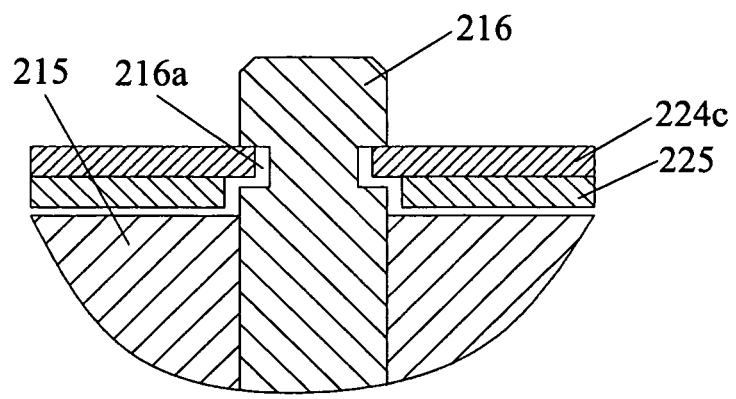
FIG. 11a is a cross-sectional side view of the AFA shown in FIG. 10 taken along the line B-B thereof.
Figure 11B:
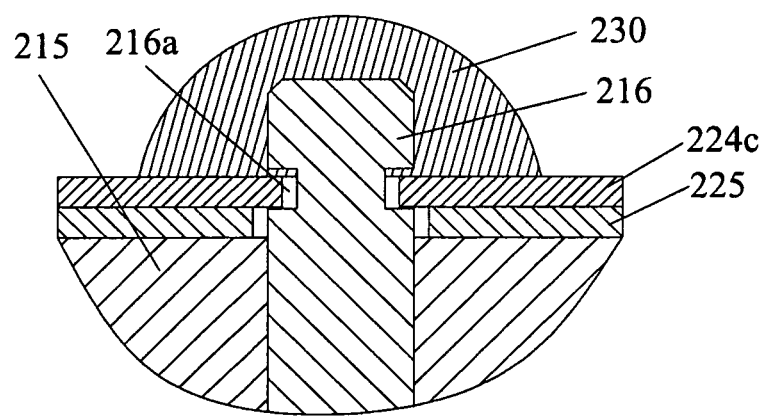

FIG. 10 is a partial enlarged view of the AFA 205. FIG. 11a is a cross-sectional side view showing the FPCA 220 pre-mounted onto the ACA 210. As illustrated in FIG. 10 and FIG. 11a, the FPCA 220 mounts on the mounting region 215 of the ACA 210 by aligning the mounting holes 226 and 227 with the grounding pins 216 and 217, respectively. Although the first through hole 224a which is a component of the mounting hole 226 is smaller than the section area of the grounding pins 216, the grounding pin 216 still can extend through the mounting hole 226, due to the grounding pads 224c around the first through hole 224a is flexible. After mounting, the stiffener 225 is sandwiched between the connecting region 224 and the mounting region 215. The grounding pad 224c is inserted into the slot 216a formed on the grounding pin 216, thereby being clamped by the slot 216a. Thus, the FPCA 220 can be pre-mounted onto the ACA 210 without using any additional fixtures or tools, it is benefit for AFA loading and unloading for next soldering process, especially for auto soldering process, for example, forming a solder ball 230 (shown in FIG. 11b) to electrically connect the grounding pin 216 and the FPCA 220 by laser soldering, therefore simplifying the mounting process and reducing the manufacturing cost thereof.

Figure 12:
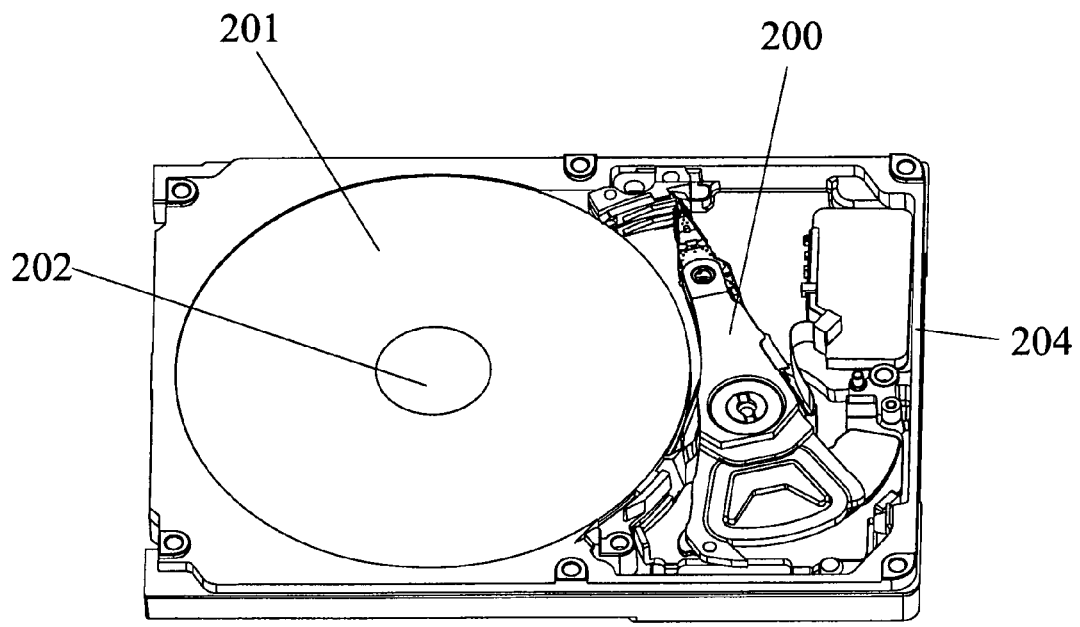
FIG. 12 is a perspective view of a disk drive unit according to an embodiment of the present invention.

FIG. 12 is a perspective view of a disk drive unit according to an embodiment of the present invention. The disk drive unit 2000 includes a HSA 200, a disk 201 and a spindle motor 202 operable to spin the disk 201, all of which are mounted in a housing 204. The HAS 200 includes the arm flexible cable assembly (AFA) 205 connected with a head gimbal assembly, the arm flexible cable assembly (AFA) 205 includes the arm coil assembly (ACA) 210 and the flexible printed cable assembly (FPCA) 220 so as to simplify the mounting process and reduce the manufacturing cost of the disk drive unit 2000. Because the structure and/or assembly process of disk drive unit 2000 of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An arm coil assembly, comprising:
   a drive arm having at least two grounding pins formed on a mounting region thereof, which are provided for electrically connecting with a flexible printed cable assembly by extending through at least two mounting holes formed on the flexible printed cable assembly; and
   a voice coil fixed on the tailing end of the drive arm for controlling the drive arm;
   wherein each grounding pin has a slot formed thereon to clamp the flexible printed cable assembly.

2. The arm coil assembly as claimed in claim 1, wherein the slot has a symmetric structure with an axis of the grounding pin as symmetric axis.

3. The arm coil assembly as claimed in claim 2, wherein the slot is ring shaped.

4. The arm coil assembly as claimed in claim 1, wherein the surface of the grounding pin is covered by coating matter.

5. The arm coil assembly as claimed in claim 1, wherein the grounding pins are installed into the mounting region of the drive arm along a diagonal thereof by press-fit.

6. An arm flexible cable assembly, comprising:
   a flexible printed cable assembly including a controlling circuit board and a flexible printed cable with at least two mounting holes formed in a connecting region thereof; and
   an arm coil assembly including a drive arm having at least two grounding pins formed on a mounting region thereof and a voice coil fixed on the tailing end of the drive arm for controlling the drive arm, the grounding pins electrically connecting with the flexible printed cable assembly by extending through the mounting holes;
   wherein each grounding pin has a slot formed thereon to clamp the flexible printed cable assembly.

7. The arm flexible cable assembly as claimed in claim 6, wherein the mounting hole is composed of a first through hole formed in the connecting region of the flexible printed cable and a second through hole formed in a stiffener which is mounted on the connecting region.

8. The arm flexible cable assembly as claimed in claim 7, wherein the first through hole is smaller than the second through hole.

9. The arm flexible cable assembly as claimed in claim 7, wherein a grounding pad whose thickness is smaller than the width of the slot is formed around the first through hole.

10. The arm flexible cable assembly as claimed in claim 9, wherein the grounding pad is made of copper material and coating material.

11. The arm flexible cable assembly as claimed in claim 6, wherein the slot has a symmetric structure with an axis of the grounding pin as symmetric axis.

12. The arm flexible cable assembly as claimed in claim 11, wherein the slot is ring shaped.

13. The arm flexible cable assembly as claimed in claim 6, wherein the surface of the grounding pin is covered by coating matter.

14. The arm flexible cable assembly as claimed in claim 6, wherein the grounding pins are installed into the connecting region of the drive arm along a diagonal thereof by press-fit.

15. A disk drive unit, comprising:
- a head gimbal assembly including a slider and a suspension with a suspension tongue that supports the slider;
- an arm flexible cable assembly connected to the head gimbal assembly;
- a disk; and
- a spindle motor operable to spin the disk;
- wherein the arm flexible cable assembly, comprising:
  - a flexible printed cable assembly including a controlling circuit board and a flexible printed cable with at least two mounting holes formed in a connecting region thereof; and
  - an arm coil assembly including a drive arm having at least two grounding pins formed on a mounting region thereof and a voice coil fixed on the tailing end of the drive arm for controlling the drive arm, the grounding pins electrically connecting with the flexible printed cable assembly by extending through the mounting holes;
  - wherein each grounding pin has a slot formed thereon to clamp the flexible printed cable assembly.

\* \* \* \* \*